United States Patent [19]

Crutcher et al.

[11] Patent Number: 4,899,322

[45] Date of Patent: Feb. 6, 1990

[54] INTEGRATED GEOPHYSICAL SURVEY SYSTEM

[76] Inventors: William C. Crutcher; Joseph R. Paysinger, both of P.O. Box 965, Katy, Tex. 77492

[21] Appl. No.: 104,449

[22] Filed: Oct. 2, 1987

[51] Int. Cl.$^4$ .............................................. G01V 1/00
[52] U.S. Cl. ...................................... 367/59; 367/14; 181/112; 364/421
[58] Field of Search .................. 367/77, 59, 14, 36, 367/37, 60; 364/421; 346/33 C; 181/112

[56] References Cited

U.S. PATENT DOCUMENTS 4,516,206  5/1985  McEvilly ............................ 364/421
4,663,743  5/1987  Rampuria et al. ................... 364/421

OTHER PUBLICATIONS

Exploration Seismology, vol. 1, Sheriff et al., Canbridge U. Press., 1982, Chapter 5.5.6 & FIG. 5.54, pp. 190-191.

GECO Brochure, Marine Seismic Data Acquisition, SEG Conference, Washington, D.C., 10/9/85.

*Primary Examiner*—Thomas H. Tarcza
*Assistant Examiner*—Ian J. Lobo
*Attorney, Agent, or Firm*—Edwin D. Schindler

[57] ABSTRACT

A computer-integrated survey system which is useful in the location of underground obstacles, such as rocks, concrete, steel and ice is disclosed. Specifically, the detection system of the present invention is operated by a microcomputer, having a series of sensors, which integrate position-determining systems, time, sub-surface radar, sonar, seismograph, laser equipment and earth-resistivity functions to accomplish its stated purpose. The system is specially designed in a compact fashion so that it may easily be hand-held, if so desired. Simultaneous with the detection and measurement of underground obstacles, in a preferred embodiment of the present invention, a permanent record of all information may be constructed for subsequent review and print-out.

5 Claims, 3 Drawing Sheets

INTEGRATED GEOPHYSICAL SURVEY SYSTEM

BACKGROUND OF THE INVENTION

1. Technical Field of the Invention

The present invention relates to an integrated geophysical survey system. More particularly, the present invention relates to a computer-integrated geophysical survey system, useful in the location of underground obstacles, such as rocks, concrete, steel and ice, and which is further capable of measuring and recording a wide array of geological conditions simultaneously with the detection of underground obstacles.

2. Description of the Prior Art

Heretofore, the art has not included a detection-measurement device for accomplishing the broad range of functions described above, and which will be described in greater detail hereinafter, despite a persistent need in industries, such as the oil, gas and pipeline industries, which are required to determine the parameters measured by the present invention on an on-going basis. In addition, it is estimated that the present invention, vis-a-vis the prior art methods of accomplishing the same, can complete the necessary geophysical survey in only 5-10% of the time now required by prior art means to gather and record similar information.

SUMMARY OF THE INVENTION

It is, therefore, an object of the present invention to provide a geophysical survey system which is capable of detecting the location of underground obstacles.

It is a further object of the invention to provide an integrated geophysical survey system which is capable of simultaneously determining and recording such geological parameters as positions of obstacles, time, seismographic conditions, earth-resistivity, etc.

It is, yet, an additional object of the present invention to provide an integrated geophysical survey system that may be mobile and provide for the recordation of measured parameters at a remote locale.

It is also an object of the present invention to overcome the disadvantages inherent in prior art devices.

The foregoing and related objects are achieved by a computer-integrated survey system which is useful in the location of underground obstacles, such as rocks, concrete, steel and ice. Specifically, the detection system of the present invention is operated by a microcomputer, having a series of sensors, which integrate position-determining systems, time, sub-surface radar, sound-transmitting detection equipment, seismograph, laser equipment and earth-resistivity functions to accomplish its stated purpose. The system is specially designed in a compact fashion so that it may easily be hand-held, if so desired. Simultaneous with the detection and measurement of underground obstacles, in a preferred embodiment of the present invention, a permanent record of all information may be constructed for subsequent review and print-out. The permanent record created by the inventive system will permit other geophysicists, engineers and managers to later review the collected data, thereby greatly reducing the chances of misinterpretation and human error.

Other objects and features of the present invention will become apparent when considered in connection with the drawing. It should, however, be noted that the drawing merely illustrates a preferred embodiment of the present invention and is not intended as a definition of the limitations thereof.

BRIEF DESCRIPTION OF THE DRAWING

In the drawing, wherein similar reference numerals denote similar features throughout the several views.

DETAILED DESCRIPTION OF THE DRAWING

Figure 1:
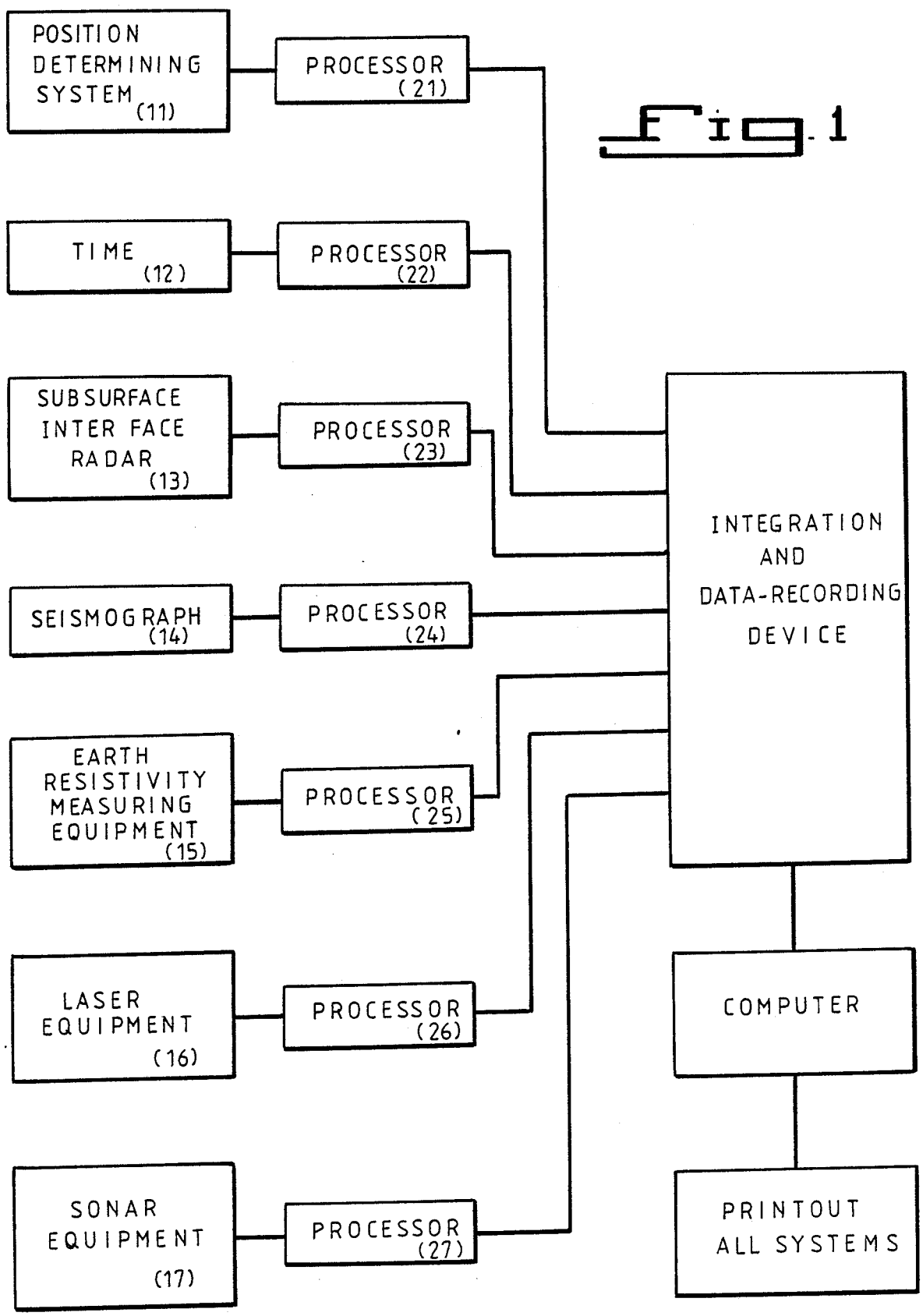
FIG. 1 is a schematic diagram of the present invention illustrating the various functions and capabilities performed by the system of the invention in conjunction with a data recording device, computer and print-out system; and, FIG. 2 is a schematic diagram of a preferred embodiment of the device of the present invention.

Turning now, in detail, to the drawing, FIG. 1 is a schematic diagram illustrating the various components of the present invention in relation to one another. Specifically, the invention comprises a series of sensors with a sensor for each of the following functions used in the detection of obstacles:

(1) position-determining system (11);
(2) time (12);
(3) sub-surface interface radar (13);
(4) seismograph (14);
(5) earth-resistivity measuring equipment (15);
(6) laser equipment (16); and,
(7) sound-transmitting detection equipment (17).

The foregoing list of sensors for use with the present invention is not an exclusive listing.

In a preferred embodiment of the present invention, each sensor input is to be serviced by a dedicated microprocessor card (21-27). This construction would allow for the development and addition of additional sensors at some future point in time, if so desired. The microprocessor cards used in the system, i.e., I/O processor cards, are preferably of the "easy link" family that, via serial backplane, a 2.4 mb/sec. line can be processed from digital or analog of many different types.

Each microprocessor card will communicate with the Integration and Data Recording Device via a 7.4 Mb/sec. serial interface using an RS-485 standard. With the foregoing apparatus, up to 256 inputs, or as few as one input, can be serviced in this fashion without modification of system software or hardware. All that is necessary to connect each input card is three twisted signal pairs; no complicated backplane connections are required. Each microprocessor card is built with the same interface (Bit Bus) and uses the same CPU and support circuit. The only difference or modifications necessary from one card to another will be in the specific I/O circuit (e.g., RS-232; 488; Analgin), which is only approximately 15-20% of each card. The basic microprocessor card is available from several manufacturers, including Seabrook Technology, Seabrook, N.H. Each card is built on a single wide Eurocard Standard with industrial strength connectors (gas tight).

In the system, distributed processing is made possible by a computer microchip, e.g., Intel Corporation's Chip No. 8044 (Intel Corporation, 3065 Bowers Avenue, Santa Clara, Calif. 95051, U.S.A.). Intel's Chip No. 8044 is a mass-produced 2.4 mb/sec. serial length and microprocessor bit-bus chip, which is used extensively in industry at the present time. All communications functions (both hardware and software) and CPU function are provided on a single 40 pin IC that is relatively inexpensive.

The inventive system further comprises a computer for organizing the collected data and means for printing out and/or displaying such data, as further discussed hereinafter.

Figure 2:
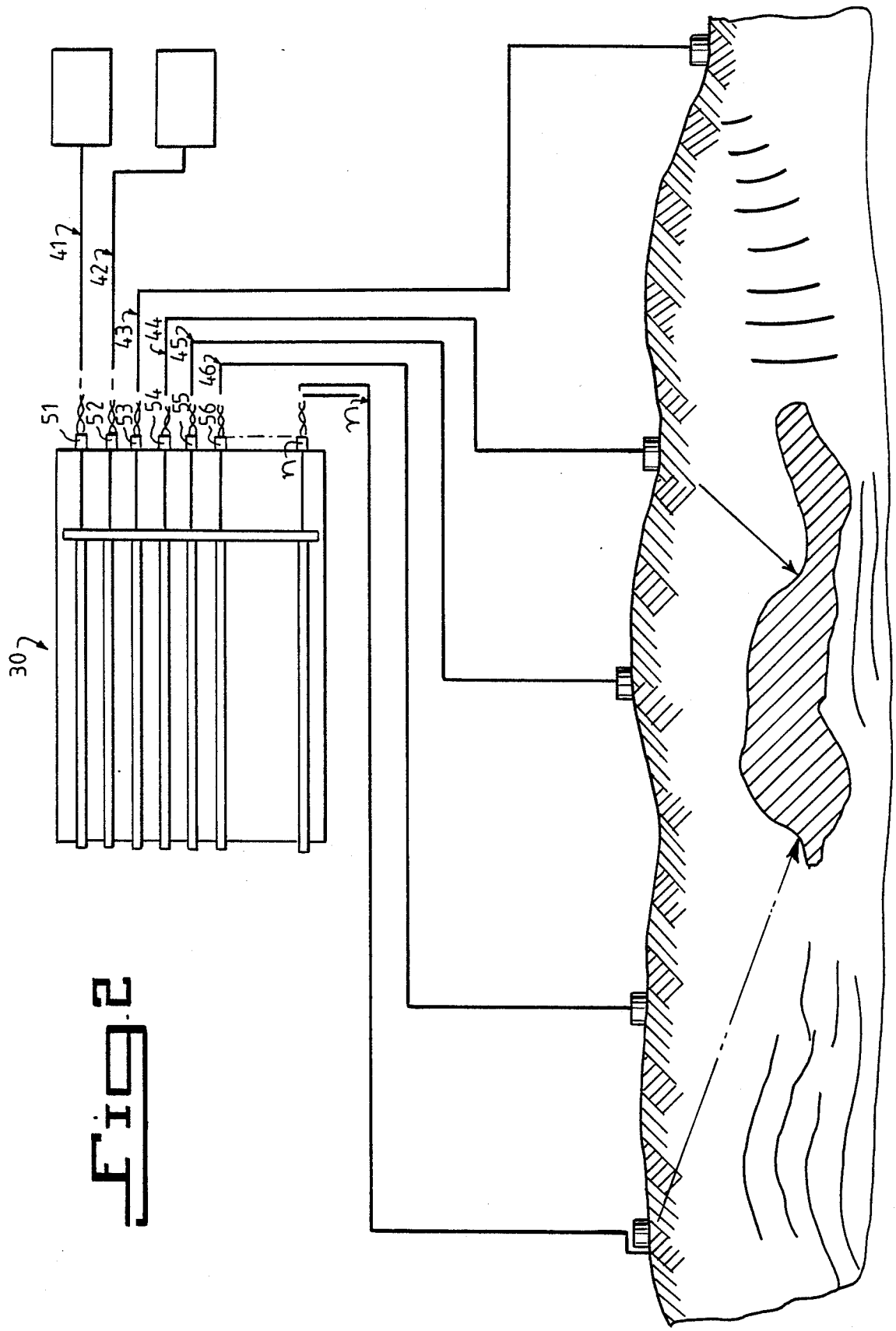

FIG. 2 illustrates a preferred embodiment of the inventive detection system 30 as comprising a simple electronic cabinet containing terminals (51, 52, 53, 54, 55, 56 . . . n) for the connection of external sensing components (41, 42, 43, 44, 45, 46 . . . n) to the internal cards (preferably some integer up to and including 16). The dimensions of the cabinet are, preferably, approximately 7" high, 19" wide and 22" long. The precise dimensions of the cabinet may, of course, be varied in a manner consistent with the internal apparatus of the cabinet.

In a preferred embodiment of cabinet 30, this cabinet would utilize an approximately 4½" rack size enclosure with a backplane for accepting 16 microprocessor cards. All such cards would be removable from the front of the unit with only the backplane connector. Both the I/O bus and the input signals enter the cards on the same single backplane connector. This results in simplicity of operation of the unit for working with a card on an extender and allows for easy board swap repair in the field.

All data gathered on the I/O bus will be saved by recordation on a standard recording medium such as, for example, 9-track or hi-density cartridges. Other options exist, as will be apparent to those skilled in the art.

Once the data is captured, preferably, the information is displayed and/or printed out in various formats as per the desires of the user, either locally, i.e., on-site, or at a base camp. The PC-DOS environment is best suited for this purpose since a great number of ready-made or commercial software and graphics packages are available in conjunction with the PC, or personal computer, now common throughout the world. The basic architecture suitable for this purpose, and which has been discussed above, is distributed processing, wherein each area of a system is provided with its own intelligence capability. This architecture allows for a great deal of adaptability and provides for complete self-testing diagnostics and failure analysis.

All communication functions, both hardware and software functions and CPU functions, as previously discussed, are provided on an inexpensive single 40 pin IC. All parts are available in low power CMOS thereby allowing for DC or battery operation. Furthermore, all data transfer and error correction functions are, preferably, accomplished by Intel's 8044 chip and are totally transparent to the programmer. For purposes of both adaptability and convenience, it is preferably that all software, hardware design and board layout will be accomplished exclusively on an IBM-PC compatible system, though this is not a necessity.

Figure 3:
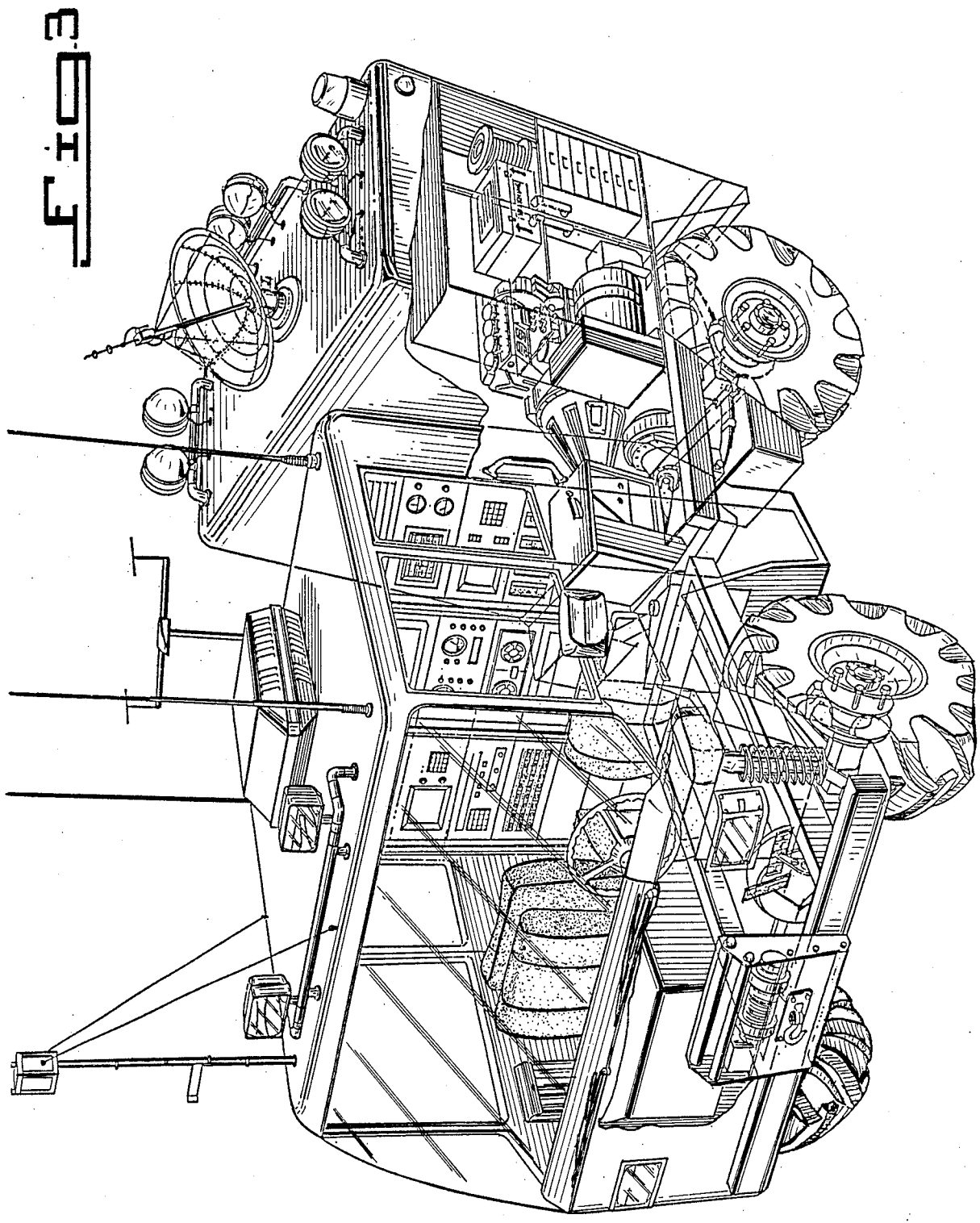
FIG. 3 is a prospective view of a preferred embodiment of the present invention encompassing automotive means for conducting a geophysical survey.

Finally, as illustrated in FIG. 3, the present invention may be used in conjunction with an automotive means for conducting a geophysical survey over an extended area.

While only several embodiments of the present invention have been shown and described, it will be obvious to those skilled in the art that many modifications may be made thereunto without departing from the spirit and scope of the invention.

What is claimed is:

1. Apparatus for conducting a land-based geophysical survey, comprising:
   - sensor means for measuring selected underground geophysical parameters with said sensor means being land-based and being capable of being designated to measure geophysical parameters, including means for determining a position of an underground object, means for sub-surface interface radar, means for seismography, means for measuring earth-resistivity equipment, means for laser equipment, means for sound-transmitting detection equipment, and means for measuring time;
   - a series of microprocessors in communication with said sensor means;
   - a data recording device in communication with said series of microprocessors;
   - a computer in communication with said data recording device for integrating information collected via said sensor means; and,
   - means for displaying or printing out of said information.

2. The apparatus according to claim 1, wherein said series of microprocessors is a series of I/O microprocessor cards.

3. The apparatus according to claim 2, wherein each microprocessor card of said series of I/O microprocessor cards communicates to said data recording device via a 7.4 Mb/sec. serial interface using RS-485 standard.

4. The apparatus according to claim 1, wherein said data recording device is a 9-track cartridge.

5. The apparatus according to claim 1, wherein said data recording device is a hi-density cartridge.

* * * * *